March 31, 1959    H. L. BEOHNER ET AL    2,879,891
FILTERING APPARATUS AND METHOD OF OPERATING SAME
Filed June 13, 1957
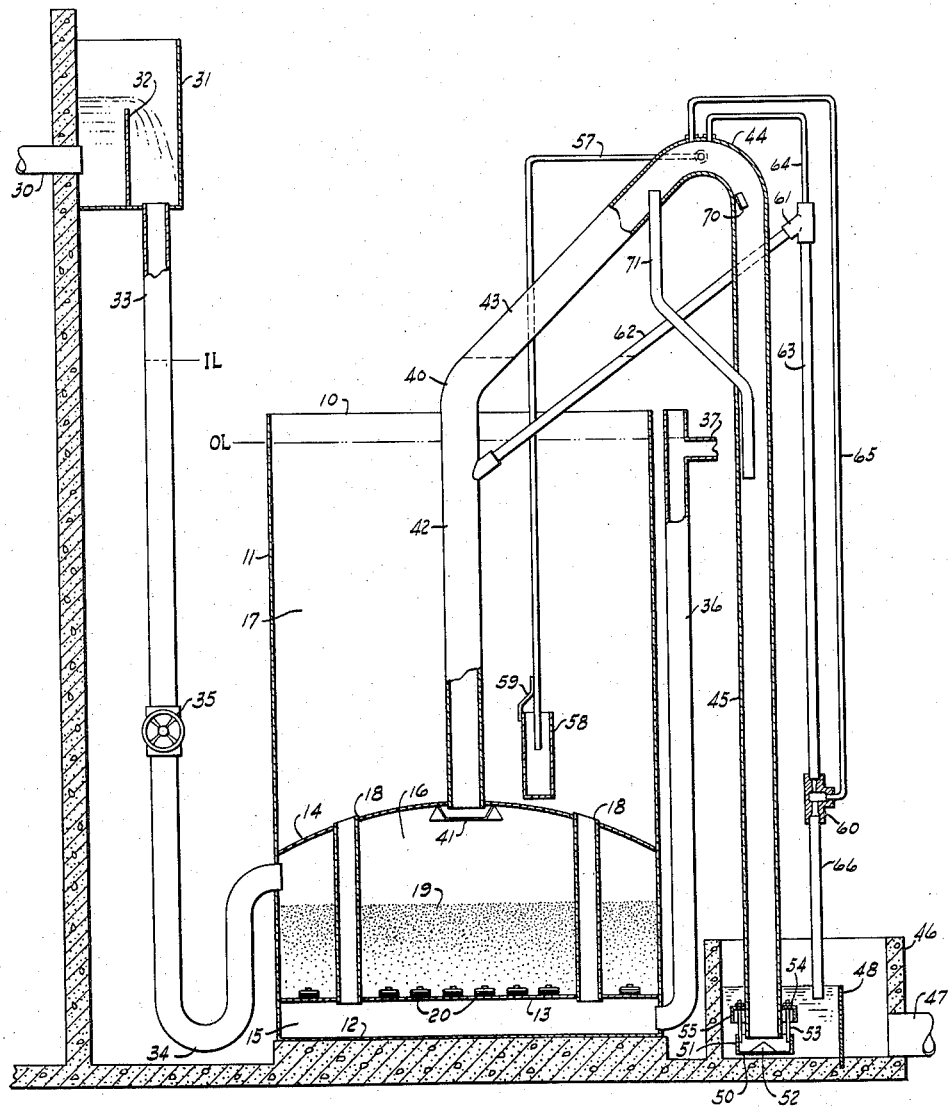
HARRY L. BEOHNER &
DURANDO MILLER JR.
INVENTORS
BY
ATTORNEY 2,879,891
Patented Mar. 31, 1959

2,879,891

FILTERING APPARATUS AND METHOD OF OPERATING SAME

Harry L. Beohner, Wilton, Conn., and Durando Miller, Jr., Pelham Manor, N.Y., assignors to Pfaudler Permutit Inc., New York, N.Y., a corporation of Delaware Application June 13, 1957, Serial No. 665,404

9 Claims. (Cl. 210—80)

This invention relates to valveless automatic filtering apparatus of the gravity type.

Filters for water and other liquids in which the flow is downward through a bed of sand or other granular material are well-known. Such filters must periodically be backwashed to waste by a reversal of the flow therethrough in order to remove the solids filtered from the water. After backwashing the filters are usually rinsed in an operation often referred to as filtering to waste.

It is an object of this invention to provide a filter in which backwashing and rinsing are carried out automatically and without use of any valves;

It is another object to provide a filter and a method of operating the same in which the filter is rinsed subsequent to backwashing and the rinse water is stored up for use as backwash water in the next following regeneration;

A further object of our invention is to provide a filter which is backwashed at a gradually decreasing rate of flow to insure effective washing as well as even and smooth settling of the bed at the end of the backwash;

A still further object of our invention is to provide a filter in which a negative head cannot develop during normal filtration.

Other objects will appear in the following detailed description and the drawing which shows a filter in accordance with our invention in elevation and partly in cross-section.

Referring now to the drawing, a tank 10 has a side wall 11, a bottom 12, a false bottom 13, and a head 14. Thus there are defined in the tank 10 a lowermost underdrain chamber 15, an intermediate filter compartment 16, and an upper wash water storage space 17. Tubes 18 welded to the false bottom 13 and the head 14 interconnect the underdrain chamber 15 and the wash water storage space 17. Within the filter compartment 16 is a bed 19 of sand or other suitable granular material supported on the false bottom 13 and a plurality of strainers 20 attached thereto. The strainers 20 are advantageously of the disc type as shown in Pick U.S. Patent 2,743,016. A supply pipe 30 for water to be filtered is connected to a weir box 31 having a weir 32. An inlet pipe 33 is provided with a loop seal 34 and a manually-operable cutoff valve 35 and leads from the weir box 31 to the upper portion of the filter compartment 16. An effluent duct 36 is connected to the underdrain chamber 15 and has an open top extending to about the same elevation as the top of tank 10. From the upper portion of the effluent duct 36 a filtered water outlet pipe 37 leads by gravity flow to a point of use for filtered water as, for example, a clearwell.

A backwash pipe 40 is connected to the head 14 so as to communicate with the top of the filter compartment 16, a baffle 41 being mounted on the head 14 as shown to force the liquid entering pipe 40 to flow in a horizontal direction adjacent to the head 14. The backwash pipe 40 has a vertical portion 42 continuing in an inclined portion 43 up to a return bend 44 and then in a downwardly extending vertical portion 45 terminating in a sump 46 which is located at an elevation below the wash water storage space 17. The sump 46 has a waste outlet 47 leading to a point of disposal for waste water and is provided with a weir 48 to keep the lower end of the vertical portion 45 of the backwash pipe 40 submerged and liquid sealed. At the lower end of the vertical portion 45 is a backwash regulator 50 which comprises a cup-shaped member 51 with a deflector 52. A plurality of threaded rods 53 welded to the member 51 carry at their upper ends nuts 54 resting on a flange 55 welded to the vertical portion 45.

A vent pipe 57 has one end connected to the return bend 44 and its other end terminating within a cup 58 located in the lower portion of the wash water storage space 17 and fastened to the vent pipe 57 by means of a bracket 59.

An ejector 60 has a supply pipe comprising a Y-fitting 61 located at a high point of such supply pipe at an elevation a small distance below the return bend 44, an upwardly extending leg 62 connecting the upwardly extending portion 42 of the backwash pipe 40 with the Y-fitting 61 and a downwardly extending leg 63 connecting the Y-fitting 61 with the ejector 60. A vent tube 64 interconects the fitting 61 and the return bend 44. A suction pipe 65 leads from the ejector 60 to the return bend 44. A discharge pipe 66 for the ejector 60 terminates within the sump 46 below the top of weir 48.

A trough-shaped deflector 70 is fastened to the inside of the return bend 44 at its downstream end and is so positioned as to deflect water flowing through the return bend 44 toward the middle of the downwardly extending portion 45 of the backwash pipe 40.

A tube 71 is connected with the inclined portion 43 of the backwash pipe 40 at an elevation just below the return bend 44 and is adapted to discharge straight down into the vertical portion 45 of the backwash pipe 40.

In describing the operation of this apparatus let it be assumed that the filter is in normal filtering service of removing suspended matter from a water supply. The level in the backwash storage space 17 is as indicated by the line marked OL. This level is practically constant, being subject to but minor variations in accordance with changes in the rate of flow through the apparatus and the flow resistance in the filtered water outlet pipe 37. The level in the inlet pipe 33 stands as indicated by the line marked IL, the difference in elevation between the levels OL and IL representing the loss of head through the apparatus, mainly the filter bed 19. The water level in the backwash pipe 40 and in the inclined ejector supply pipe 62 is essentially the same as in the inlet pipe 33 since they are in communication through the upper portion of the filter compartment 16, the level in the inlet pipe 33 being higher by the relatively small friction loss in pipe 33.

Water enters through supply pipe 30, flows over the weir 32 down through inlet pipe 33 and open valve 35, into the upper portion of the filter compartment 16, down through the bed 19 and strainers 20 into the underdrain chamber 15. Thence it passes through the effluent duct 36 into the filtered water outlet pipe 37.

As the filtering step continues and impurities accumulate on top of and within the bed 19, the loss of head through the filter increases and since the level OL in the backwash storage space 17 and the effluent duct 36 remains substantially constant the level IL in the inlet pipe 33 as well as in pipes 43 and 62 gradually rises.

As soon as the level in pipe 62 has reached the elevation of the Y-fitting 61 water flows through pipes 62 and 63 to the ejector 60 and thence through pipe 66 into the sump 46. Any air bubbles entering the pipe 62 are released in the Y-fitting 61 and pass through the vent tube 64 into the return bend 44. The suction created in the ejector 60 draws air from the return bend 44 through pipe 65 and discharges it into the sump 46. Thus a partial vacuum is created in the air confined in the backwash pipe 40 between the level in the inclined portion 43 and the sump level in portion 45. This partial vacuum causes the levels in both the inclined portion 43 and in the vertical portion 45 of the backwash pipe 40 to rise. As soon as the level in the inclined portion 43 has reached the upper end of tube 71, water begins to flow through tube 71 and falls free through the vertical portion 45. This free fall of water through the portion 45 entrains air bubbles and discharges them from the lower end of portion 45 into the sump 46. As the level in inclined portion 43 rises further it reaches the return bend 44 and at first a relatively small flow of water passes through the return bend 44. The deflector 70 prevents this water from clinging to the sides of the vertical portion 45 and instead deflects it toward the middle of portion 45. This free fall of water also entrains air bubbles which are carried down and out through the lower end of portion 45 into the sump 46. Air is now rapidly being evacuated from the backwash pipe 40 through the joint action of the ejector 60, the tube 71 and the deflector 70, and as soon as most of the air has thus been removed the backwash pipe 40 becomes substantially filled with water and acts as a siphon. Water now flows from the backwash storage space 17 through the tubes 18 into the underdrain chamber 15, then upwardly through the strainers 20 and the bed 19, around baffle 41, through the backwash pipe 40 into the sump 46 and over the weir 48 into the waste outlet 47.

The backwash regulator 50 is initially set by adjusting the nuts 54 to provide the desired backwash rate by partially obstructing the lower end of the vertical portion 45. Such rate of flow is higher at the beginning of the backwash operation and gradually decreases as the level in the backwash storage space 17 drops since this reduces the effective head of the siphon in backwash pipe 40. Thus, for example, when using sand as a filtering medium, the backwash rate through bed 19 may start at about 20 gallons per square foot per minute and gradually slow down to about 10 gallons per square foot per minute of filter bed area near the end of the backwash step. Such diminishing backwash rate is more effective than the uniform flowrate generally used heretofore. The higher initial flow quickly lifts and expands the bed 19 about 50 percent and provides greater initial turbulence to wash and scrub the filtering medium. The lower flowrate toward the end of the backwash step hydraulically grades the medium and settles the bed 19 evenly and smoothly.

During the backwashing step the incoming flow of water through the inlet pipe 33 continues. This flow passes directly to waste through the upper portion of the filter compartment 16 and the backwash pipe 40 but such flow is normally at a rate of about 2 gallons per square foot of filter bed area per minute and thus constitutes a relatively small portion of the flow through the apparatus during the backwash step. During backwashing the siphon in backwash pipe 40 causes a lowering of the pressure in the upper portion of the filter compartment 16 and the loop seal 34 is provided to prevent any air from being sucked into the filter compartment 16 through the inlet pipe 33 at such time.

During the backwash step a relatively insignificant stream of water flows from the backwash storage space 17 through the vent pipe 57 to the return bend 44 and thence directly to waste. When the level in the backwash storage space 17 has dropped below the top of cup 58 such small flow through the vent pipe still continues, lowering the level within the cup 58 while the level in the backwash storage space 17 outside the cup 58 drops further because of the flow through the backwash pipe 40. As soon as the level in the cup 58 has reached the lower end of vent pipe 57, air enters through vent pipe 57 and flows to the return bend 44, thus quickly breaking the siphon in backwash pipe 40 and terminating the backwash operation. The water in the portions 42 and 43 of the backwash pipe 40 drops back and slightly raises the level in the backwash storage space 17, but not sufficiently to enter the cup 58. Thus the backwash operation is cleanly and positively terminated. Without the cup 58 the aforesaid backflow of water from the backwash pipe 40 plus the continuing inflow through pipe 33 would again close off the lower end of the vent pipe 57 as soon as a little air has been admitted to the return bend 44 and the siphon would, therefore, start again. Such starting and stopping of the siphon might repeat itself several times if the cup 58 was omitted.

As soon as the backwash operation has been terminated the water entering through inlet pipe 33 flows downward through the filter bed 19 and thence through strainers 20, the underdrain chamber 15 and the tubes 18, into the backwash storage space 17. Thus the bed 19 and the underdrain chamber 15 are rinsed clean of any small amount of impurities left at the end of the backwash step, and the spent rinse water is stored up in the wash water storage space 17. The major portion of such spent rinse water, to be used in backwashing the bed 19 the next time, is filtered water of high quality. As soon as the wash water storage space 17 has been filled to the level of the filtered water outlet pipe 37 the rinse step is automatically terminated and filtered water now flows to service again, as initially described.

The cutoff valve 35 is left open during normal operation of the apparatus and is only closed to take the apparatus out of service for shutdown or repair.

The operation of a filtering apparatus in accordance with our invention thus involves no valve operations whatsoever yet is completely automatic. Immediately after the filter has been backwashed and rinsed the bed is clean and the loss of head usually amounts to less than 1 foot at the customary filtration rate of about 2 gallons per square foot of filter bed area per minute. Backwashing and rinsing occur whenever the loss of head through the filter has increased to a predetermined value, usually 4 or 5 feet of water, which is controlled by the elevation of the Y-fitting 61 above the level OL in the backwash storage space 17.

Because the filtered water discharge is above the elevation of the filter bed a negative head cannot develop in the filter compartment 16 during normal filtration. This completely eliminates the primary cause of many troubles occurring in conventional filters such as cracked beds, channeling and "mud balls." Without a negative head accumulated turbidity is not sucked deeply into the bed but stays confined to the upper few inches of the bed 19 wherefrom it is easily washed off. Mud balls caused by large bubbles of air rushing upwardly and overturning the layer of accumulated impurities on top of the bed 19 cannot form because there is no low pressure or negative head condition to cause air release within the bed 19 during filtration.

Because of its simplicity and the absence of mechanically moving parts our apparatus is relatively low in cost and inexpensive in maintenance. The use of the stored rinse water for the next following backwash step makes it also economical in the use of water for reconditioning.

In conventional filters the supply of an adequate flowrate for backwashing frequently presents a problem since backwashing is usually carried out with something like 5 or more times the normal filtration rate. Our apparatus presents no such problem since it stores its own supply of backwash water.

While we have shown what we consider the preferred embodiment of our invention, many changes and modifications may obviously be made without departing from the spirit of our invention. Thus the effluent duct 36 could be arranged to pass from the underdrain chamber 15 through the filter compartment 16 and the wash water storage space 17. The wash water storage space 17 can, of course, be incorporated in a tank which is separate and independent of the filter compartment 16, and which may be of larger diameter if desired. The ejector 60, the deflector 70, and the tube 71 form optional and alternative means for evacuating air from the backwash pipe 40 to initiate the backwash operation. In relatively small filters where the backwash pipe 40 has a small diameter, none of these devices are necessary. In larger sizes of filters, however, one or all of these devices are desirable in order to insure a quick and positive start of the backwashing operation. The underdrain shown in the drawing and consisting of the false bottom 13, the underdrain chamber 15 and the strainers 20 has been found highly satisfactory, but other types of underdrain could, of course, be employed.

We believe that the principal use for our novel filter is in filtering water, as described above, but it could, of course, be used in other types of treatment of water and in treating other liquids.

What we claim is:

1. A method of operating a filter having a cycle of operations consisting of the steps of downflow filtering, upflow backwashing and downflow rinsing which comprises collecting the water used in each said rinsing step, storing said collected rinse water during the next succeeding filtering step in such manner as to keep the rinse water separate from the subsequently filtered water and employing said collected rinse water to backwash said filter in the next succeeding backwashing step.

2. A filtering apparatus comprising a filter compartment, an underdrain for said filter compartment, a backwash storage space having an open top and being located above said filter compartment, tube means interconnecting said underdrain and the lower portion of said backwash storage space, an inlet pipe leading from a source of supply of liquid to be filtered to the upper portion of said filter compartment, an effluent duct extending upwardly from said underdrain and having an open top at the elevation of the top of said backwash storage space, an outlet pipe for filtered liquid connected with said effluent duct and having its highest portion at an elevation near but below the top of said backwash storage space, a waste sump located at an elevation below said backwash storage space, a backwash pipe connected to the top of said filter compartment, said backwash pipe having a return bend located above the top of said backwash storage space, a portion extending upwardly from said filter compartment to said return bend, and a portion extending downwardly from said return bend and terminating in said sump, and a vent pipe connected to said return bend and terminating in the lower portion of said backwash storage space.

3. In the apparatus of claim 2, a loop in said inlet pipe, said loop extending below the elevation at which said inlet pipe is connected with said filter compartment.

4. In the apparatus of claim 2, a cup having an open top and being located in the lower portion of said backwash storage space, said vent pipe terminating within said cup.

5. In the apparatus of claim 2, a regulator for adjusting the rate of flow of backwashing, said regulator comprising a movable member located in said sump and being adapted to partially obstruct the end of said downwardly extending portion of said backwash pipe.

6. In the apparatus of claim 2, means connected with said return bend for evacuating air from said backwash pipe.

7. The apparatus of claim 6, said evacuating means being a trough-shaped deflector fastened to the inside of said return bend at its downstream end, said deflector being positioned to deflect liquid flowing through said return bend toward the middle of said downwardly extending portion of said backwash pipe.

8. The apparatus of claim 6, said evacuatng means being an ejector, a discharge pipe for siad ejector extending into said sump, a suction pipe for said ejector extending to said return bend, and a supply pipe for said ejector, said supply pipe having a high point located below the elevation of said return bend and above the top of said backwash strorage space, a leg extending upwardly from said upwardly extending portion of said backwash pipe to said high point and a leg extending downwardly from said high point to said ejector.

9. In the apparatus of claim 8, a vent pipe extending from said high point to said return bend.

References Cited in the file of this patent

UNITED STATES PATENTS

| 625,556 | Hyatt | May 23, 1899 |

FOREIGN PATENTS

| 18,269 | Great Britain | A.D. 1906 |
| 202,402 | Germany | Oct. 8, 1908 |